(12) United States Patent
Xie et al.

(10) Patent No.: US 8,237,393 B2
(45) Date of Patent: Aug. 7, 2012

(54) SYSTEM FOR MEASURING FAN ROTATIONAL SPEED

(75) Inventors: Ling-Yu Xie, Shenzhen (CN); Kun-Lung Wu, Taipei Hsien (TW); Sheng-Chung Huang, Taipei Hsien (TW); San-Yong Yang, Shenzhen (CN); Xin-Ping Zhang, Shenzhen (CN); Jing Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 432 days.

(21) Appl. No.: 12/565,773

(22) Filed: Sep. 24, 2009

(65) Prior Publication Data
US 2011/0001443 A1  Jan. 6, 2011

(30) Foreign Application Priority Data
Jul. 1, 2009  (CN) .......................... 2009 1 0303915

(51) Int. Cl.
*G05B 11/28* (2006.01)
(52) U.S. Cl. ........ 318/599; 318/721; 318/779; 318/799; 318/811
(58) Field of Classification Search .................. 318/480, 318/599, 400.01, 721, 783, 779, 799, 471, 318/472, 280; 310/62, 63, 40.5; 388/811; 359/333, 341.1; 700/59, 69, 151; 702/96, 702/145, 159; 361/695, 679.48; 446/178; 454/102; 324/160, 161, 162, 164, 174
See application file for complete search history.

(56) References Cited

U.S. PATENT DOCUMENTS

| | | | |
|---|---|---|---|
| 5,727,928 A * | 3/1998 | Brown | 417/44.11 |
| 5,837,879 A * | 11/1998 | Zick | 73/1.37 |
| 6,037,732 A * | 3/2000 | Alfano et al. | 318/471 |
| 6,428,282 B1 * | 8/2002 | Langley | 417/2 |
| 7,138,781 B2 * | 11/2006 | Murray et al. | 318/400.04 |

* cited by examiner

*Primary Examiner* — Walter Benson
*Assistant Examiner* — Antony M Paul
(74) *Attorney, Agent, or Firm* — Altis Law Group, Inc.

(57) ABSTRACT

A system is used to measure a fan rotational speed. The system includes a main controller, a first socket coupled to the linear fan, a second socket connected to the main controller, and an optical fiber amplifier connected to the main controller. A PWM (pulse width module) fan is coupled to the second socket, the PWM fan sends a first rotational speed signal, which represent a rotation speed of the PWM fan, to the main controller via the second socket. The optical fiber amplifier is capable of radiating light on fan blades of the linear fan, and sensing light reflected by the fan blades to count a rotational speed of the linear fan, and generating a second rotational speed signal which represents a rotational speed of the linear fan. The optical fiber amplifier sends the second rotational speed signal to the main controller.

19 Claims, 6 Drawing Sheets

SYSTEM FOR MEASURING FAN ROTATIONAL SPEED

BACKGROUND

1. Technical Field

The present disclosure relates to measurements, and particularly to a system for measuring rotational speed of a fan.

2. Description of Related Art

With the development of the computer industry, operating frequencies of most components in computer systems have increased, and the heat generated by these components has become greater as well. If the heat is not removed in a timely fashion, the computer system may overheat and the system could be damaged or destroyed. Usually, a fan is used for preventing the temperature in the computer system from becoming too high. Generally, the faster the fan rotating, the faster the fan can remove heat. However, a fixed speed fan operating at a fast rotational speed consumes the same power whether the temperature of the system is high or low. Fans with controllable speed are used to mitigate this problem. However, most controllers of the fan speed are not precise because determining the speed, of the fan, is imprecise. This imprecise fan speed leads to the same aforementioned problems such as noise, unnecessary power consumption, and inadequate heat dissipation.

Therefore a system for precisely measuring a fan rotational speed is needed in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
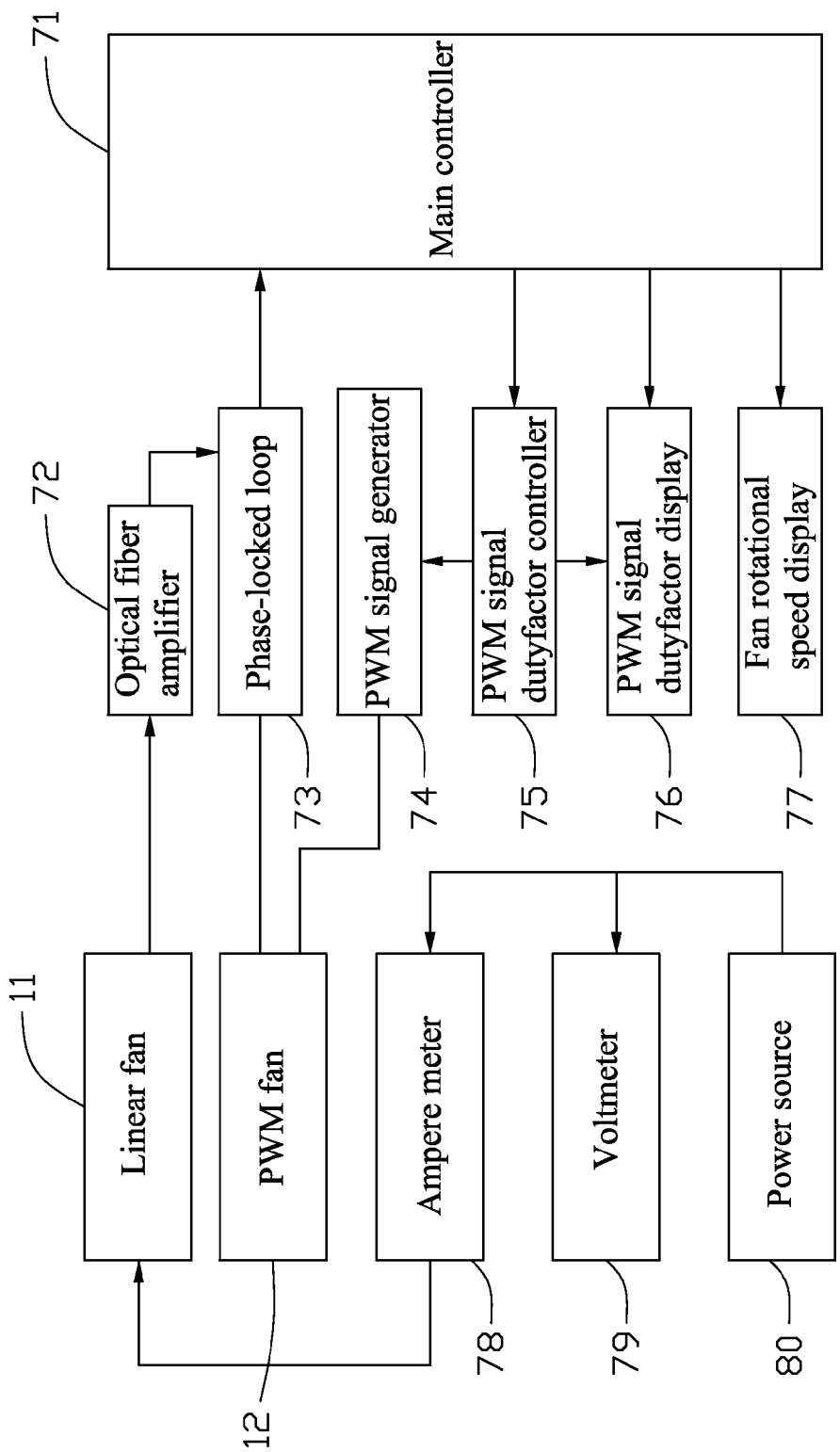
FIG. 1 is a block view of a system for measuring fan rotational speed.

Referring to FIGS. 1 to 6, a system, in accordance with an embodiment, is used to measure fan rotational speeds of a linear fan 11 and a PWM (pulse width module) fan 12. The system includes a main controller 71, an optical fiber amplifier 72, a phase-locked loop 73, a PWM signal generator 74, a PWM signal duty-factor controller 75, a PWM signal duty-factor display 76, a fan rotational speed display 77, an ampere meter 78, a voltmeter 79, and a power source 80. The power source 80 includes an adapter 81. The adapter 81 is supplied with alternating current, and converts the alternating current into direct current, such as +12V direct current power, +5V direct current power. The power source 80 includes an adjustable power source 83 that provides power to the linear fan 11. An output voltage of the adjustable power source 83 is capable of being adjusted between +1.8V to +14V.

Figure 3:
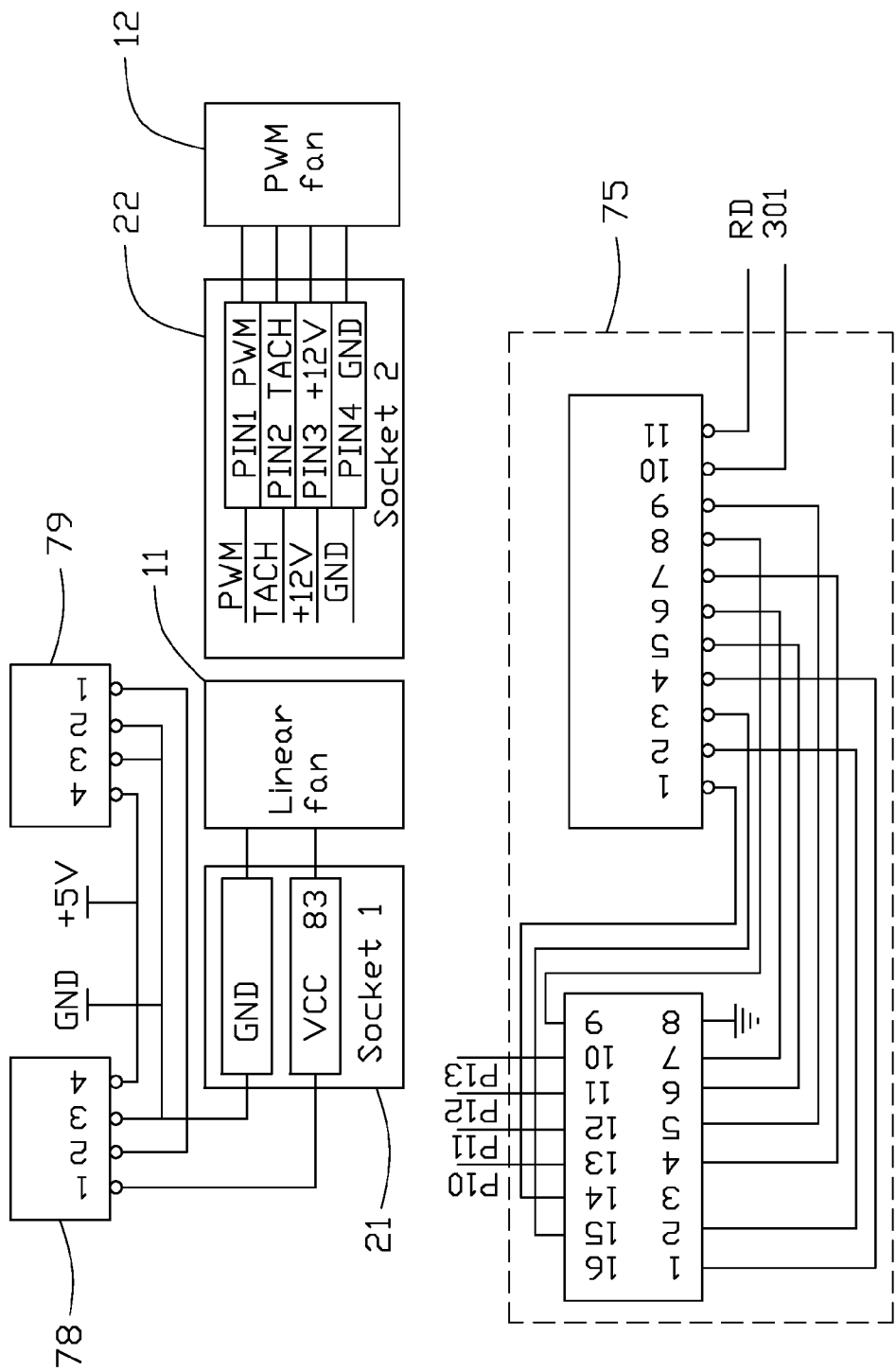

Referring to FIG. 3, the system includes a first socket 21 adapted to couple to the linear fan 11, and a second socket 22 adapted to couple to the PWM fan 12. The first socket 21 is connected to the adjustable power source 83. The second socket 22 includes four pins: pin 1, pin 2, pin 3, and pin 4. The pin 1 receives a PWM signal generated by the PWM signal generator 74. The rotational speed of the PWM fan 12 is adjustable by varying a duty factor of the PWM signal. The pin 2 receives a first rotational speed signal generated by the PWM fan 12. The rotational speed signal represents a rotational speed of the PWM fan 12. The pin 3 is connected to the +12V direct current. The pin 4 is connected to ground.

The ampere meter 78 and the voltmeter 79 are connected to the first socket 21 for measuring current and voltage provided to the linear fan 11.

Figure 2:
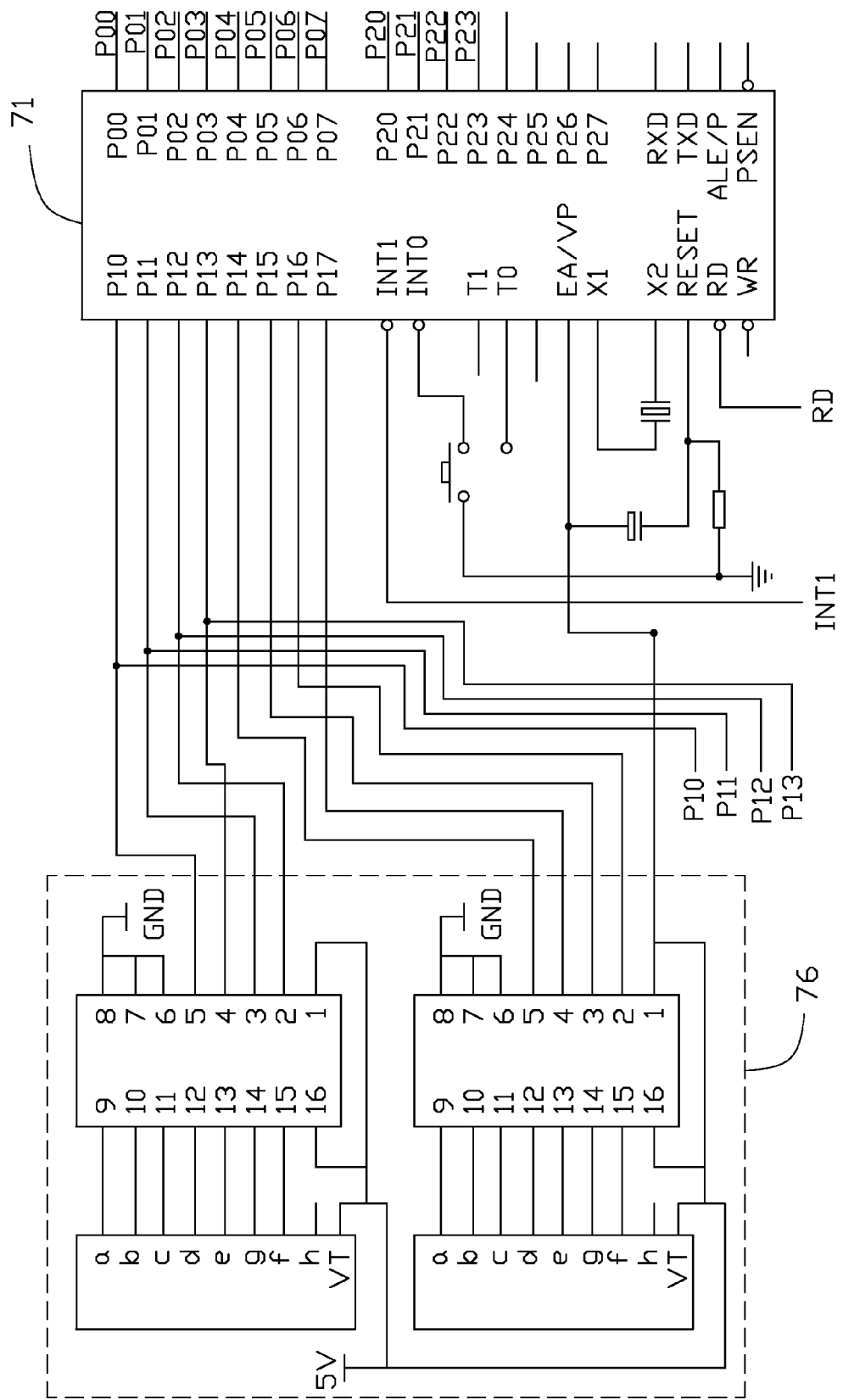
FIGS. 2 to 6 are circuit diagrams of the system of FIG. 1
Figure 4:
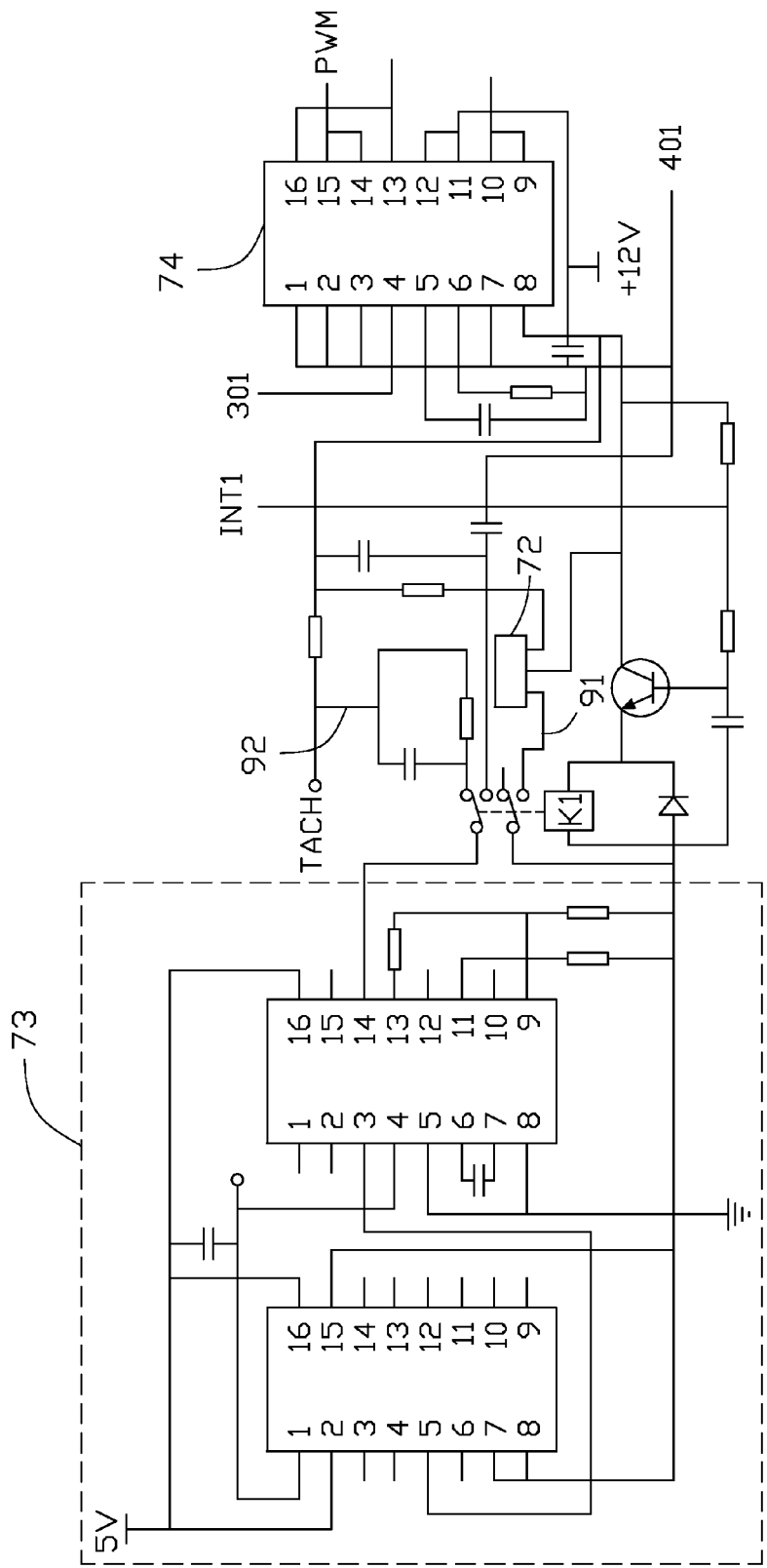
Figure 5:
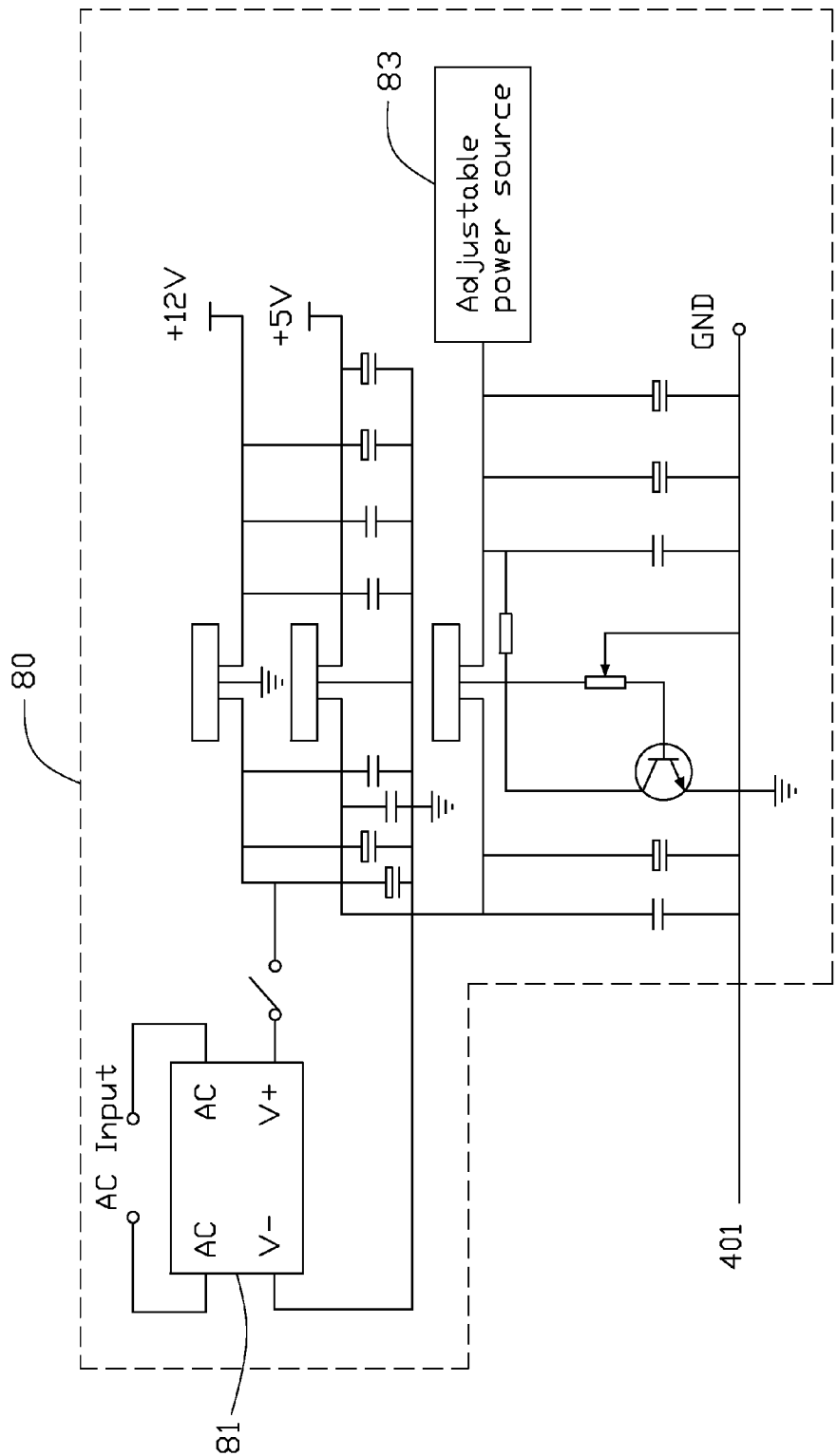

Referring to FIGS. 2 and 4, in one embodiment, the main controller 71 is the AT89S51 chipset manufactured by ATMEL company. A pin T0 of the main controller 71 is connected to an output terminal of the phase-locked loop 73. A pin INT1 of the main controller 71 is connected to a control terminal of the switch K1. The switch K1 further includes a first end connected to an input terminal of the phase-locked loop 73, and a second end which includes a first branch 91 and a second branch 92. The second branch 92 is connected to the pin 2 of the second socket 22 for receiving the first rotational speed signal. The first branch 91 is connected to the optical fiber amplifier 72. The optical fiber amplifier 72 is capable of radiating light on fan blades of the linear fan 11, and sensing light reflected by the fan blades to measure a rotational speed of the linear fan 11 by counting the fan blades over a predetermined time, and further generating a second rotational speed signal representing a rotation speed signal of the linear fan 11. The first branch 91 receives the second rotational speed signal. When the pin INT1 is set in a low voltage, the first end of the switch K1 is connected to the second branch 92. When the pin INT1 is set in a high voltage, the first end of the switch K1 is connected to the first branch 91.

Referring to FIGS. 3 and 4, pins P10 to P13 of the main controller 71 are connected to the PWM signal duty-factor controller 75, thereby, transmitting a duty-factor signal to the duty-factor controller 75. The duty-factor 75 is connected to the PWM signal generator 74 to control a duty-factor of the PWM signal generated by the PWM signal generator 74 according to the duty-factor signal.

Referring to FIG. 2, the PWM signal duty factor display 76 is connected to pins P10 to P17 of the main controller 71 to display the duty-factor of the PWM signal.

Figure 6:
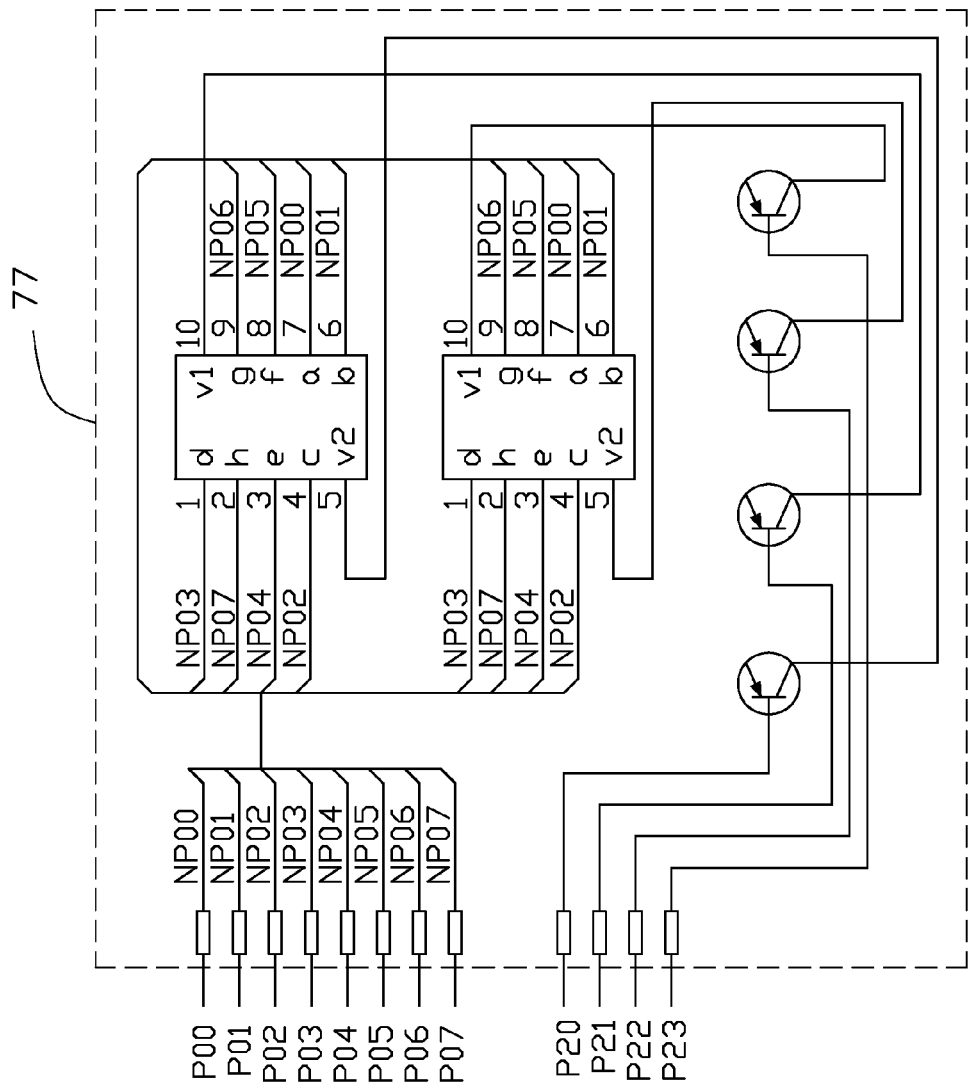

Referring to FIGS. 2 and 6, pins P00 to P07 and P20 to P23 are connected to the fan rotational speed display 77. The fan speed display 77 is capable of displaying the fan rotational speed thereon.

In use, if a rotational speed of the linear fan 11 needs to be measured, the linear fan 11 is coupled to the first socket 21. The linear fan 11 is supplied with the adjustable power source 63 to rotate. The ampere meter 78 and voltmeter 79 measures current and voltage provided to the linear fan 11. The pin INT1 of the main controller 71 is set in a high voltage, thereby the input terminal of the phase-locked loop 73 becomes connected to the first branch 91. The optical fiber amplifier 72 radiates light on fan blades of the linear fan 11, and senses light reflected by the fan blades to count a rotational speed of the linear fan 11. The optical fiber amplifier 72 sends the second rotational speed signal to the phase-locked loop 73 via the first branch 91. The phase-locked loop 73 filters the second rotational speed signal, and then sends it to the pin T0 of the main controller 71. The controller 71 controls the fan rotational speed display 77 to display the rotational speed of the linear fan 11. The adjustable power source 83 can adjust the voltage provided to the linear fan 11. Therefore, the rotational speed of the linear fan 11 under different voltages can be measured.

If a rotational speed of the PWM fan 12 needs to be measured, the PWM fan 12 is coupled to the second socket 22. The pin INT1 of the main controller 71 is set to a low voltage, so the input terminal of the phase-locked loop 73 becomes connected to the second branch 92. The main controller 71 sends a duty-factor signal to the duty-factor controller 75. The PWM signal generator 74 generates a PWM signal according to the duty-factor signal. The PWM signal is sent to the PWM fan 12 to adjust a rotational speed of the PWM fan 12. The PWM fan 12 sends the first rotational speed signal to the phase-locked loop 73 via the second branch 92. The phase-locked loop 73 filters the first rotational speed signal, and then sends it to the pin T0 of the main controller 71. The controller 71 controls the fan rotational speed display 77 displaying the rotational speed of the PWM fan 12. The duty-factor of the PWM signal can be adjusted. Therefore, the rotational speed of the PWM fan 12 under different duty-factors can be measured.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A system for measuring fan rotational speed, comprising:
    a main controller;
    a first socket coupled to a linear fan;
    a second socket connected to the main controller, a PWM (pulse width module) fan coupled to the second socket, the PWM fan sending a first rotational speed signal, which represent a rotation speed of the PWM fan, to the main controller via the second socket; and
    an optical fiber amplifier connected to the main controller, the optical fiber amplifier capable of radiating light on fan blades of the linear fan, and sensing light reflected by the fan blades to measure a rotational speed of the linear fan, and generating a second rotational speed signal which represents a rotational speed of the linear fan; the optical fiber amplifier sending the second rotational speed signal to the main controller.

2. The system of claim 1, wherein a phase-locked loop is connected to the main controller, the phase-locked loop filters the first rotational speed signal and the second rotational speed signal.

3. The system of claim 1, further comprising a switch, wherein the switch comprises a first end connected to the phase-locked loop and a second end, the second end comprises a first branch connected to the optical fiber amplifier and a second branch connected to the second socket.

4. The system of claim 3, wherein the switch comprises a control pin connected to the main controller, the switch is controlled by the main controller via the control pin to alternatively connect the first end to the first switch or the second switch of the second end.

5. The system of claim 4, wherein the first end is connected to the second branch when the control pin is set in a low voltage, and the first end is connected to the first branch when the control pin is set in a high voltage.

6. The system of claim 1, wherein an adjustable power source is provided to the linear fan to adjustably provide power to the linear fan.

7. The system of claim 1, wherein a PWM signal generator provides a PWM signal to the PWM fan.

8. The system of claim 7, wherein a PWM signal duty-factor controller is connected to the PWM signal generator to adjust a duty-factor of the PWM signal.

9. The system of claim 8, wherein the PWM signal duty-factor controller is connected to the main controller, a PWM signal duty-factor display is connected to the main controller to display the duty-factor.

10. The system of claim 1, wherein a fan rotational speed display is connected to the main controller to display the rotational speed.

11. A system for measuring fan rotational speed, comprising:
    a main controller;
    an adjustable power source providing power to a linear fan, the adjustable power source capable of adjusting a voltage provided to the linear fan; and
    an optical fiber amplifier capable of measuring a rotational speed of the linear fan and generating a first rotational speed signal which represents a rotational speed of the linear fan; the optical fiber amplifier sending the first rotational speed signal to the main controller; and
    a first and second socket connected to the main controller, wherein a pulse width module (PWM) fan is coupled to the second socket, the PWM fan sends a second rotational speed signal, which represent a rotation speed of the PWM fan, to the main controller via the second socket.

12. The system of claim 11, further comprising a switch, wherein the switch comprises a first end connected to the phase-locked loop and a second end, the second end comprises a first branch connected to the optical fiber amplifier and a second branch connected to the first socket.

13. The system of claim 12, wherein the switch comprises a control pin connected to the main controller, the switch is controlled by the main controller via the control pin to alternatively connect the first end with the first branch or the second branch of the second end.

14. The system of claim 13, wherein the first end is connected to the second branch when the control pin is set in a low voltage, and the first end is connected to the first branch when the control pin is set in a high voltage.

15. The system of claim 11, wherein a PWM signal generator provides a PWM signal to the PWM fan.

16. The system of claim 15, wherein a PWM signal duty-factor controller is connected to the PWM signal generator to adjust a duty-factor of the PWM signal.

17. The system of claim 16, wherein the PWM signal duty-factor controller is connected to the main controller, a PWM signal duty-factor display is connected to the main controller to display the duty-factor.

18. The system of claim 11, wherein a fan rotational speed display is connected to the main controller to display the rotational speed.

19. The system of claim 11, wherein a phase-locked loop is connected to the main controller, the phase-locked loop filters the first rotational speed signal.

\* \* \* \* \*